(12) United States Patent  
Weinblut et al.

(10) Patent No.: US 9,174,267 B2  
(45) Date of Patent: Nov. 3, 2015

(54) WIRE LOOPING TOOL

(71) Applicant: M&Y Trading Corp., Carteret, NJ (US)

(72) Inventors: Ronnie Weinblut, Bergenfield, NJ (US); Tung Moon Fai, Guangzhou (CN)

(73) Assignee: M&Y Trading Corp., Carteret, NJ (US)

( * ) Notice: Subject to any disclaimer, the term of this patent is extended or adjusted under 35 U.S.C. 154(b) by 57 days.

(21) Appl. No.: 13/928,149

(22) Filed: Jun. 26, 2013

(65) Prior Publication Data

US 2014/0182348 A1 Jul. 3, 2014

Related U.S. Application Data

(63) Continuation-in-part of application No. 29/440,909, filed on Dec. 28, 2012.

(51) Int. Cl.
*B21F 1/00* (2006.01)
*B23D 29/02* (2006.01)

(52) U.S. Cl.
CPC .............. *B21F 1/002* (2013.01); *B23D 29/023* (2013.01)

(58) Field of Classification Search
CPC ............ B21F 1/003; B21F 11/00; B25F 1/04; B23D 29/023; A44C 27/00
USPC ............... 72/409.16, 409.01; 140/102, 102.5, 140/104, 149, 106, 93 A, 123, 123.6, 139; 81/6, 7, 8, 383, 381, 416, 418, 436, 81/9.41, 9.42
See application file for complete search history.

(56) References Cited

U.S. PATENT DOCUMENTS

| | | | | |
|---|---|---|---|---|
| 345,215 A * | 7/1886 | Crocker | ............................ | 7/134 |
| 550,879 A * | 12/1895 | Golling | ...................... | 72/409.03 |
| 650,369 A * | 5/1900 | Brown | ............................ | 7/117 |
| 1,337,616 A * | 4/1920 | Olhovsky | .................... | 140/102.5 |
| 2,824,583 A * | 2/1958 | Knoester | ...................... | 140/104 |
| 3,221,779 A * | 12/1965 | Noel | ............................. | 140/104 |
| 6,612,147 B2 * | 9/2003 | Beetz et al. | ................ | 72/409.16 |
| 6,715,333 B2 * | 4/2004 | Liang | .............................. | 72/324 |
| 7,308,815 B2 * | 12/2007 | Chen | .......................... | 72/409.14 |
| 7,343,939 B1 * | 3/2008 | Sheriff | ....................... | 140/102.5 |
| 2002/0095970 A1 * | 7/2002 | Yang | .......................... | 72/409.01 |
| 2006/0075642 A1 * | 4/2006 | Elkins | .............................. | 30/233 |
| 2008/0178707 A1 * | 7/2008 | Stevens | ........................... | 81/9.43 |

* cited by examiner

*Primary Examiner* — Shelley Self
*Assistant Examiner* — Gregory Swiatocha
(74) *Attorney, Agent, or Firm* — Stern & Schurin LLP

(57) ABSTRACT

An improved arts and crafts tool designed to loop and cut wire in a single fluid motion at any desired location along the length of the wire. The tool comprises a pair of arms each arm terminating in a soft-cover handle adapted to be gripped by a user. The upper portions of the arms have looping and cutting members for looping and cutting wire at a desired length. Disposed within one of the cutting members is an ejection aperture which harmlessly directs cut sections of waste wire away from a user and enables the tool to cut sections of wires at any desirable point.

21 Claims, 8 Drawing Sheets

WIRE LOOPING TOOL

RELATED APPLICATION

This application is a continuation-in-part of and claims priority to U.S. application Ser. No. 29/440,909, filed on Dec. 28, 2012, which is incorporated herein by reference.

FIELD OF INVENTION

The present application relates generally to a tool for creating arts and crafts. More specifically, the invention relates to an improved tool for looping and cutting wire in connection with the design and construction of jewelry, charms and trinkets. Even more specifically, the present invention involves a one-step tool for looping and trimming wire to a desired length in a single motion.

BACKGROUND OF THE INVENTION

A number of tools are designed for use in connection with the creation of arts and crafts projects and, more particularly, the art of jewelry making. Among them are piers having rounded heads for looping, bending and shaping wire; wire cutters having sharpened edges for cutting the ends of wire after other sections of wire are looped; and combination tools that are designed to perform the functions of looping, bending, shaping preceded by and/or followed by the task cutting the wire to a desired or customized length. For example, two types of prior art looping pliers are The Beadsmith® 6-in-1 Looping Pliers and The Beadsmith® 4-in-1 Pliers. The 6-in-1 Looping Pliers provides six different looping sizes ranging from 2-9 mm. The 4-in-1 Pliers provide a number of utility features for jewelry making, including round tips for use in wire looping, a groove for dosing jump rings, a flat section for flattening wire and sharpened edges for cutting wire or thin headpins.

Through improvements in these and similar types of arts and crafts tools, individuals with arthritic hand and finger joints have found it somewhat easier to continue to use these tools, often times in a manner consistent with use prior to the onset of their arthritic condition. For example, springs positioned between the handles have enabled the heads of looping and cutting tools to automatically separate without manual effort by a user, thereby reducing the stress placed on arthritic joints in the hands and fingers of users with each stroke or squeeze. Likewise, soft covers applied to the handles of looping and cutting tools that are used in jewelry making and other arts and crafts projects further ease the stresses caused by handling these tools. Nevertheless, due to the large amount of pain that is often present in arthritic joints, there is still an increasing need by many afflicted users to accomplish more with each stroke or squeeze of these types of tools. Yet, many tools are generally incapable of effectively performing the tasks and looping and cutting with a single stroke or squeeze, in the same fluid motion. Likewise, even amongst those users who possess pain-free, non-arthritic joints, there is a need to accomplish manual, craft-based wire looping and cutting tasks more quickly in order to increase productivity and reduce the time needed to create crafts and jewelry that utilize looped wiring.

Moreover, prior art looping and cutting tools are generally incapable of consistently discarding cut sections of wire in a particular direction, away from the user. It would be beneficial to incorporate such a feature into wire cutting tools in a manner consistent with their ordinary use.

Lastly, prior art looping and cutting tools are generally not configured to be able to perform customized cutting of wire at specified points along the length of the wire beyond a predetermined fixed length of approximately ½-¾ inch. Enabling customized looping and cutting increases the utility of such a tool by allowing a user to determine a precise position for cutting and looping of wire.

Based on the foregoing, there is an ongoing need to provide a more versatile arts and crafts tool which addresses the shortcomings of the prior art.

SUMMARY OF THE INVENTION

In view of the deficiencies and drawbacks in the prior art, it is a primary object of the present invention to provide an improved arts and crafts tool that simultaneously performs the tasks of wire looping and precision cutting with a single stroke.

It is another object of the present invention to provide a wire looping and cutting tool that is more efficient and enables increased productivity by its users.

It is a further object of the present invention to provide a wire looping and cutting tool with an ejection aperture that directs cut sections of wire away from a user.

It is yet another object of the present invention to provide an improved wire looping and cutting tool which enables the cutting of wire at specified points along the length of the wire beyond a predetermined fixed length.

Additional objectives of the present invention will be apparent from the disclosure which follows.

In summary, the invention involves a tool designed to loop and cut wire at any desired location along the length of the wire with a single squeeze of the tool's handles. Tool comprises a pair of arms, each arm terminating in a soft-cover handle adapted to be gripped by a user. The upper portions of the arms comprise looping and cutting members for looping and cutting wire at a desired length and in a single fluid motion. Disposed within one of the cutting members is an ejection aperture which harmlessly directs cut sections of waste wire away from a user. The ejection aperture further enables the tool to cut sections of wires at any desirable point.

BRIEF DESCRIPTION OF THE DRAWINGS

The above-described and other advantages and features of the present disclosure will be appreciated and understood by those skilled in the art from the following detailed description and drawings of which

DETAILED DESCRIPTION OF THE INVENTION

Figure 1:
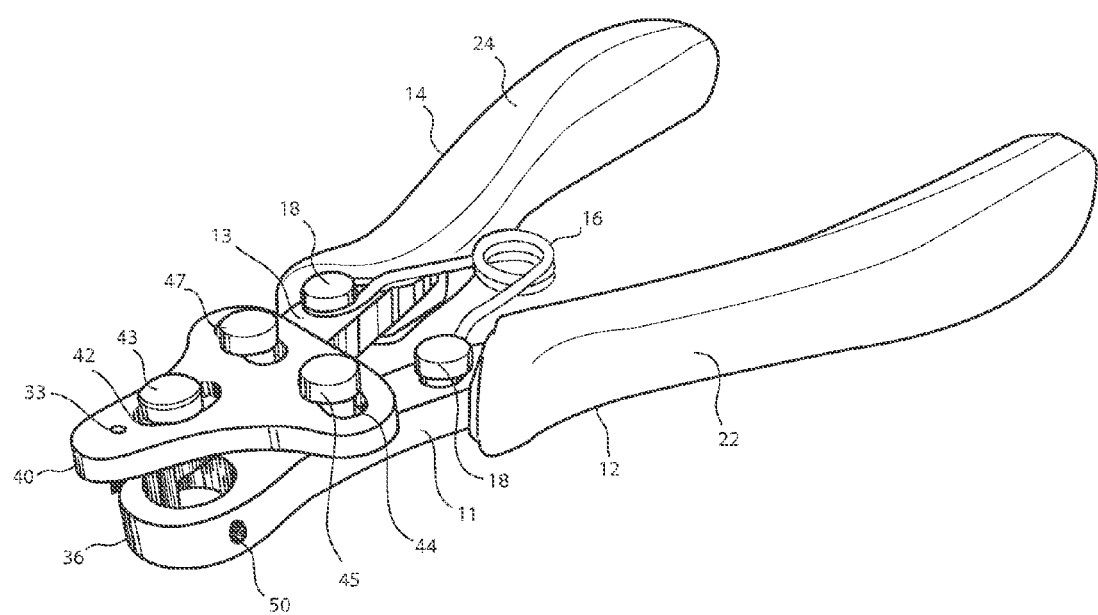
FIG. 1 is a top, front and left-side perspective view of the wire looping tool of the present invention.
Figure 2:
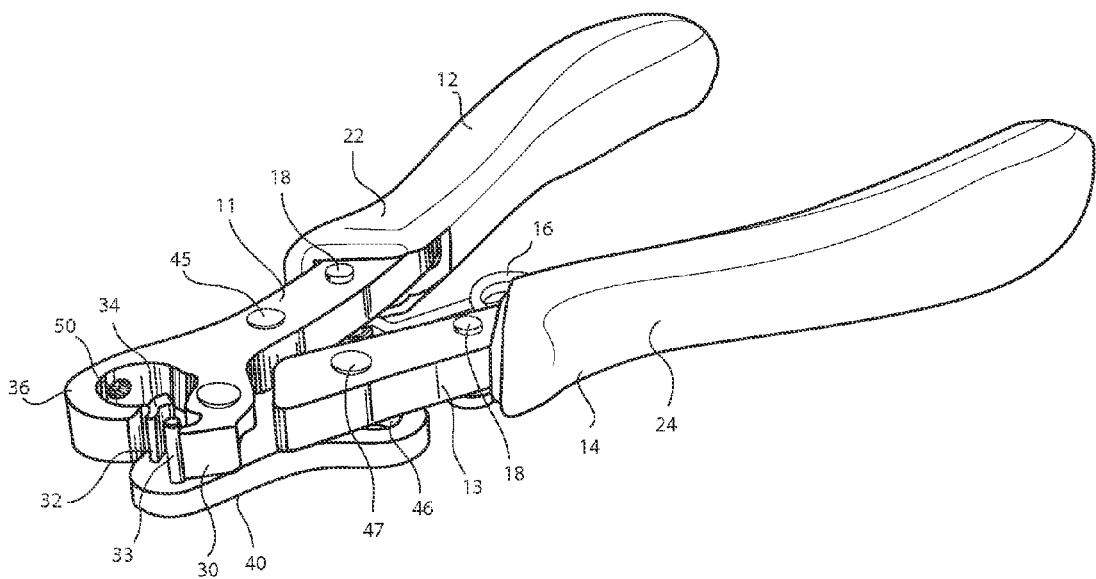
FIG. 2 is a bottom, front and right-side perspective view thereof.

With references to FIG. 1 through FIG. 8, there is shown a wire looping and cutting tool 10 of the present invention, The tool 10 comprises a pair of arms 11, 13 the ends of which terminate in handles 12, 14 which are biased apart by a spring 16 against which manual pressure is applied when the tool 10 is used to loop and cut wire W. The spring 16 is secured to handles 11, 13 by a pair of securing bolts 18, 18 at unsheathed intermediate sections of the arms 11, 13 above where handles 12, 14 terminate. Soft and flexible foam or rubber covers 22, 24 are applied at each handle 12, 14 to provide an ergonomic grip for users to hold, clench and squeeze the tool 10 during its use.

Figure 5:
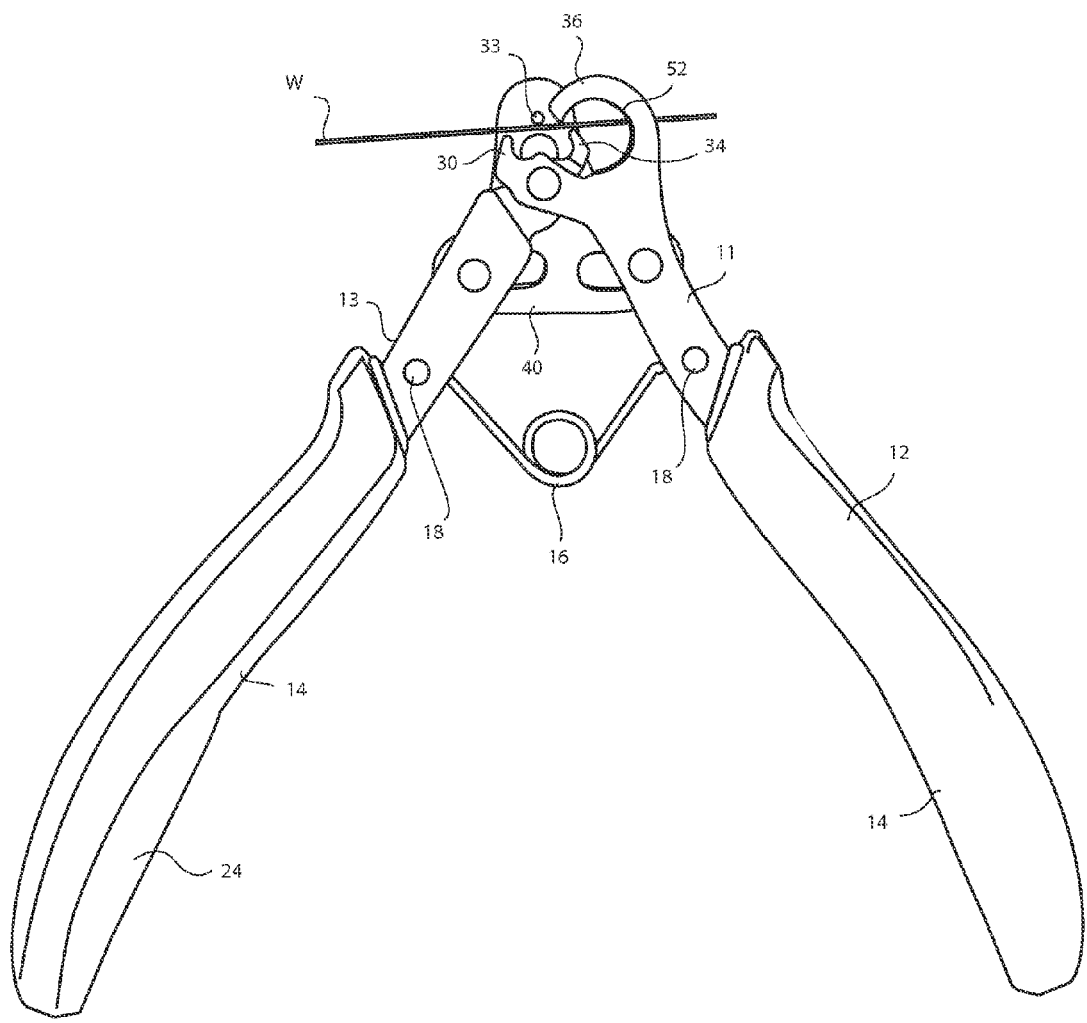
FIG. 5 is a bottom plan view of the tool receiving a section of wire for looping and cutting.
Figure 6:
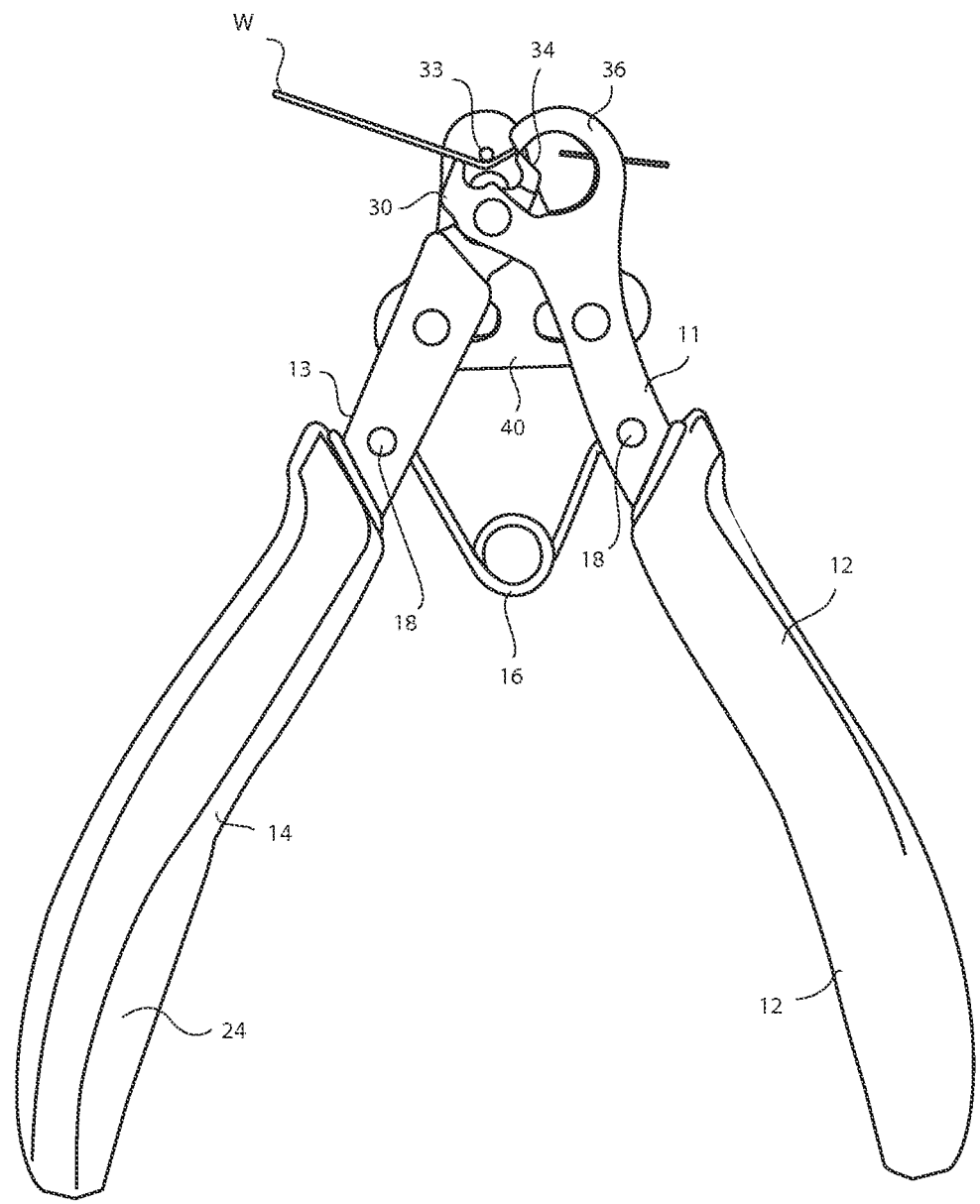
FIG. 6 is a bottom plan view of the tool in the process of looping and cutting the wire, with the tool handles in a partially compressed position.
Figure 7:
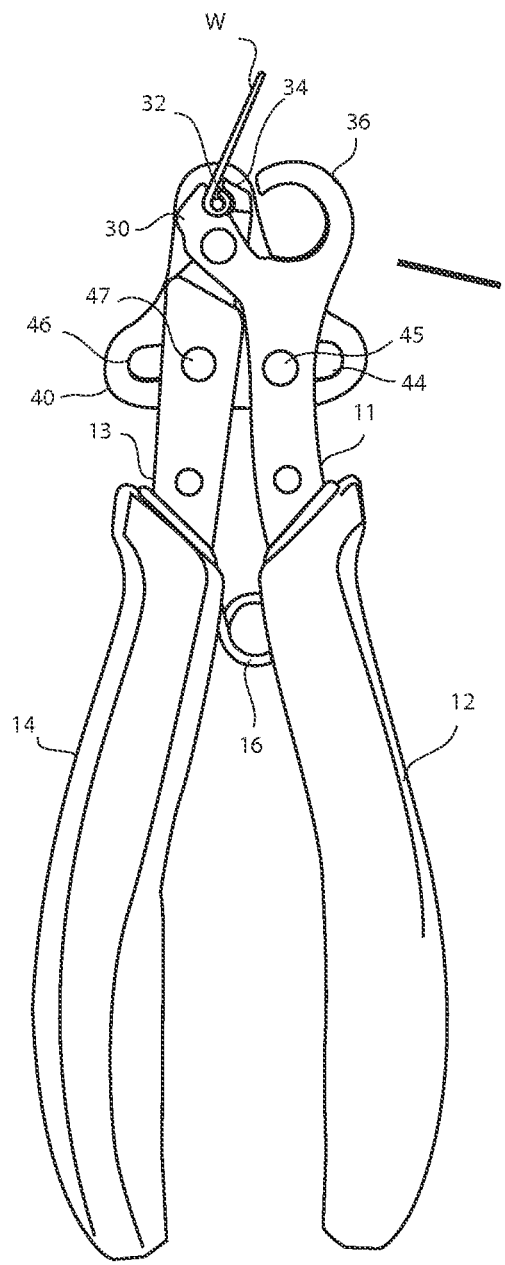
FIG. 7 is a bottom plan view of the tool creating a loop after ejecting the cut section wire out the ejection aperture, with the tool handles in a fully compressed position.
Figure 8:
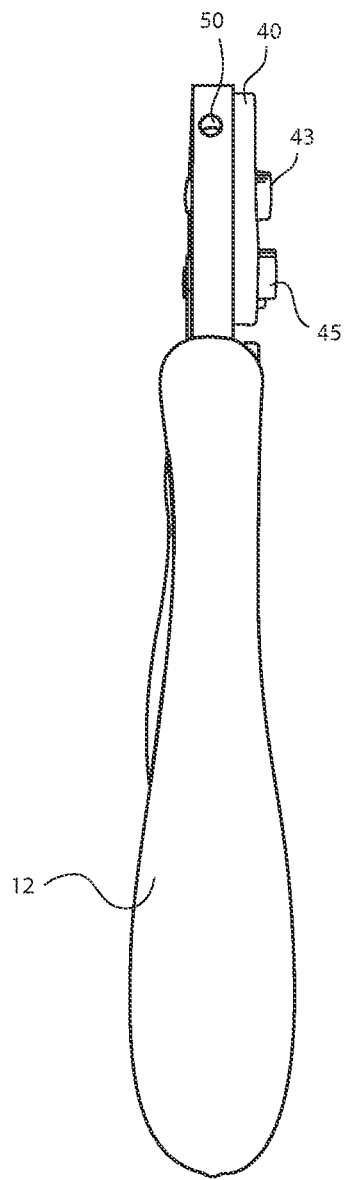
FIG. 8 is a left side view of the wire looping tool of the present invention showing the ejection aperture.

Arm 11 extends upwardly to form external looping member 30 and arm 13 extends upwardly to form internal looping member 32. As shown in FIG. 5, FIG. 6 and FIG. 7, when handles 12, 14 are compressed together from a fully relaxed position shown in FIG. 5 to a fully compressed position shown in FIG. 7, looping members 30, 32 converge around a looping pin 33, progressively bending the inserted wire W to form an eye pin. Even in the most compressed position around looping pin 33, the looping members 30, 32 preferably do not contact the looping pin 33. Instead, there is a circular channel between the interior surfaces of looping members 30, 32 and the looping pin 33 that is sufficiently wide enough to accommodate wire W without damaging its structural integrity.

As shown in FIG. 6, looping member 32 further serves as one of the two cutting members 34, 36 which are utilized for cutting excess wire away from the section that is being looped. During the wire bending process, prior to wire W being fully looped, internal cutting member 34 and external hooked cutting member 36 pinch wire W until a section is snapped off. As shown in FIG. 7, the same end of wire W formed by the cutting process serves as the end of the eye loop that is formed around looping pin 33. Using the tool 10, wire W is initially cut at a desired position and then bent to form an eye loop in a single, continuous fluid motion.

Figure 3:
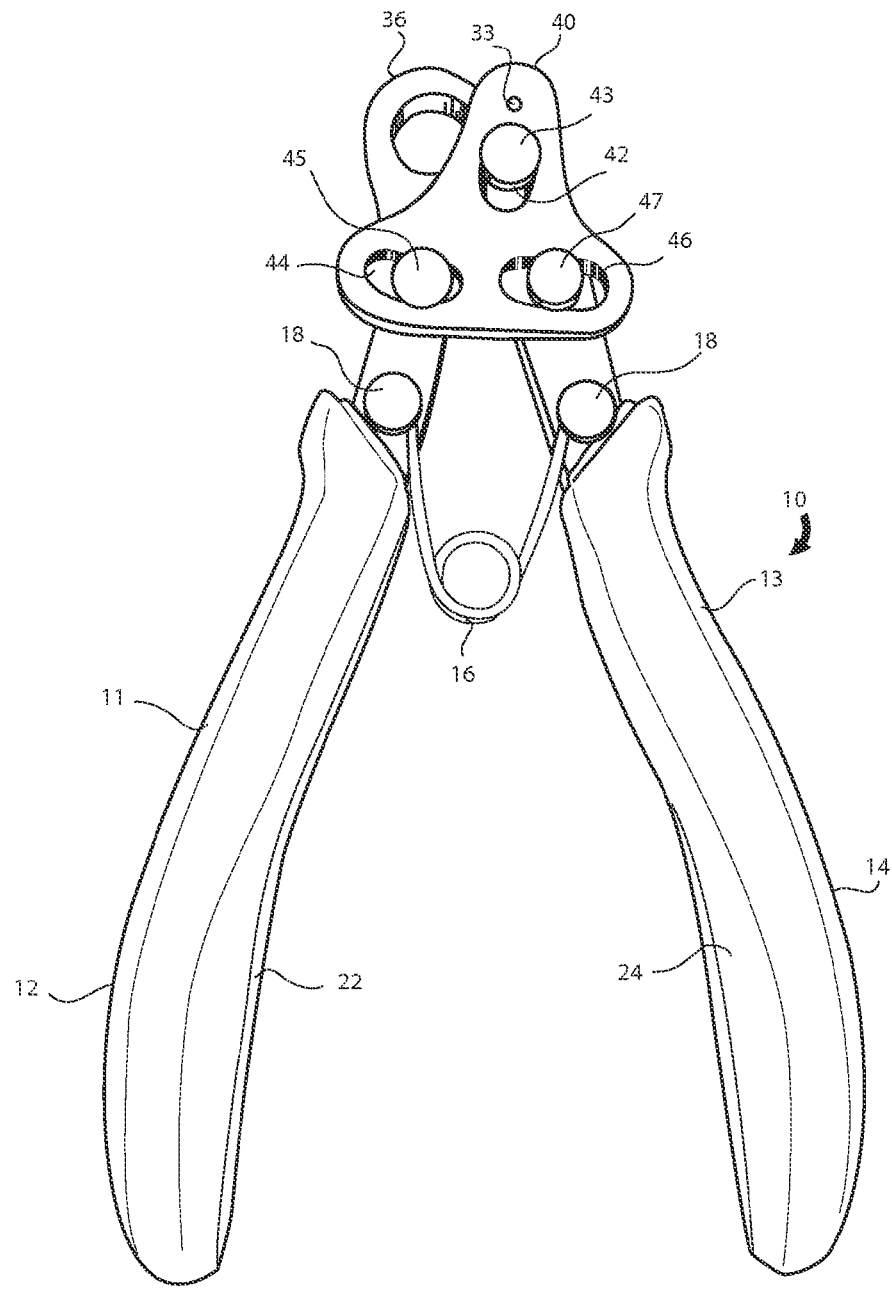
FIG. 3 is a top plan view thereof.
Figure 4:
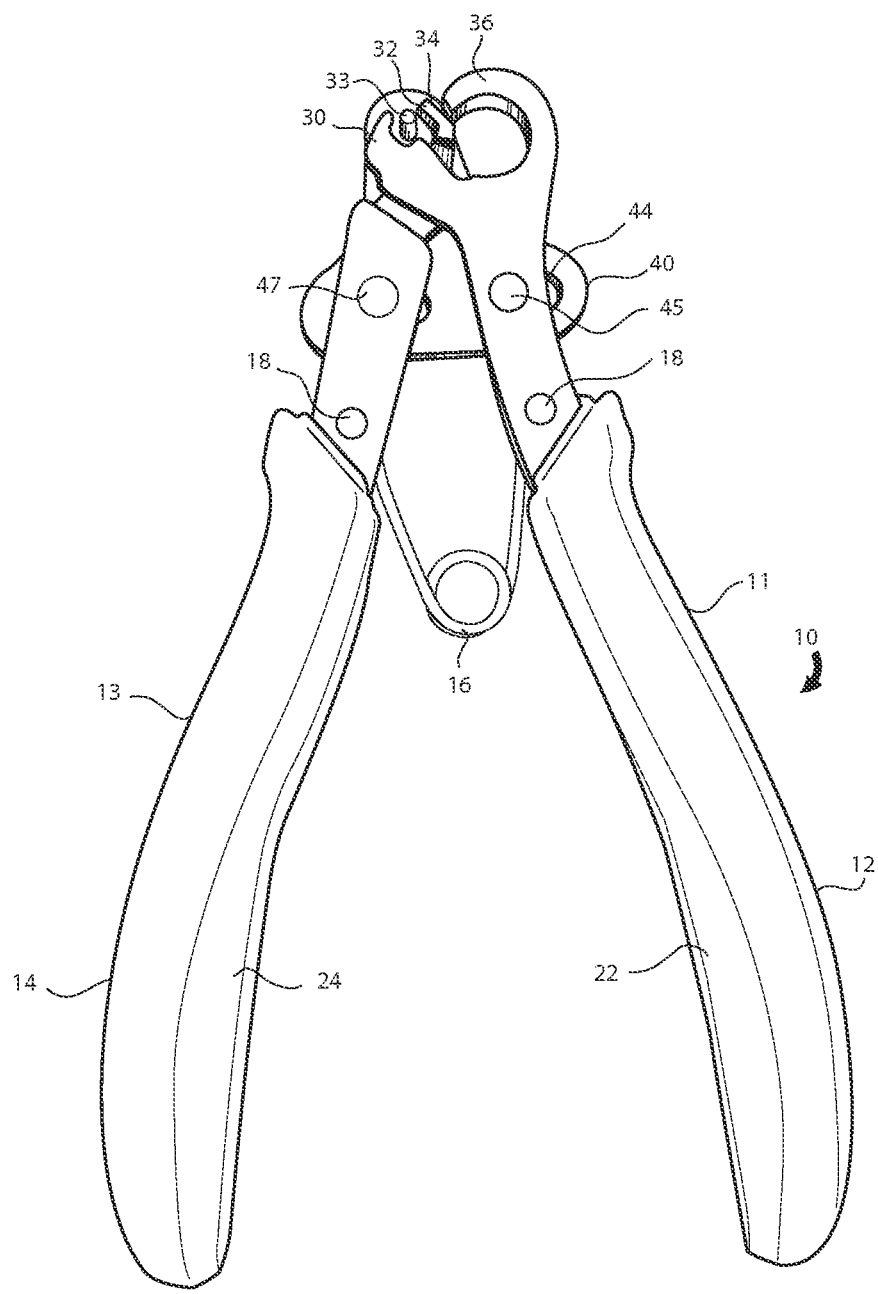
FIG. 4 is a bottom plan view thereof.

As shown most clearly in FIG. 1 and FIG. 3, a triangular retaining plate 40 is provided to retain and guide the movement of the looping and cutting arms 11, 13 when the tool 10 is in use or at rest. The retaining plate 40 possesses three slots—an upper slot 42, a left slot 44 and a right slot 46—generally corresponding to the vertices of a triangle, through which three retaining bolts 43, 45, 47 secure the retaining plate 40 to arms 11, 13. When secured to the retaining plate 40, arms 11, 13 proceed in a fluid, guided motion which force cutting members 34, 36 and looping members 30, 32 to act accordingly.

In a fully relaxed position, bolts 45, 47 are positioned at the extreme ends of left slot 44 and right slot 46, respectively, with the length of each slot 44, 46 determining how far handles 12, 14 can spread apart from one another in compliance with the bias produced by spring 16. While the tool is in a relaxed position, retaining bolt 43 is at its lowermost point in upper slot 42. Conversely, in a fully compressed position, bolts 45, 47 are positioned at the innermost ends of the left slot 44 and right slot 46, respectively, serving as the limit of which the arms may compress. Likewise, when fully compressed, retaining bolt 43 is at its highest point in upper slot 42. It should be appreciated that as arms 11, 13 move inward, looping members 30, 32 are forced upward together along the trajectory of upper slot 42 since both looping members 30, 32 are hinged upon bolt 43. As looping member is forced upward, cutting member 36 pivots and pinches wire W between it and cutting member 34. Notably, the limits of compression and location and configuration of the slots preferably enable cutting of wire W and looping of wire W without the looping members 30, 32 coming in contact with looping pin 33. Moreover, it should be appreciated that in some preferred embodiments, any one or all of slots 42, 44, 46 may be slightly curved to provide a more fluid motion and more effective cutting and looping of wire W, preferably with minimal friction.

While in the preferred embodiment described herein external looping member 30 and external cutting member 36 both extend from arm 11 and internal looping member 32/internal cutting member 34 extend from arm 13, it should be appreciated that additional embodiments of the wire looping tool may be formed while still keeping within the spirit and scope of the invention. For example, an alternate embodiment may be created such that an external looping member may extend from the arm positioned on the same side of the tool instead of the one positioned on the opposing side.

As shown in FIG. 1, FIG. 2, FIG. 7 and FIG. 8, in the hooked portion of cutting member 36, there is an ejection aperture 50 through which cut wire is laterally ejected after cutting is completed by cutting members 34, 36. Ejection aperture 50 ensures that the cut waste wire is discarded in a harmless manner away from a user as the users continues to bend and loop wire W.

In addition to providing a means to harmlessly discard cut waste wire, ejection aperture 50 further enables the customized cutting of wire W at any desired point along the length of the wire, In particular, absent an ejection aperture 50, wire W may be cut at selected points along its length. However, the number of points are limited to a section of approximately ½-¾ inches or the approximate length of wire that spans the distance between cutting member 34 and interior curved surface 52 (see FIG. 5), With the ejection aperture 50, a section of wire may be inserted further and through the aperture 50 and then cut at practically any desirable point along its length.

Tool 10 is preferably utilized with dead-soft or half-hard precious metal wire, craft wire, copper wire or brass core wire. With the disclosed construction, the tool 10 bends and trims wire having a thickness between 26 gauge and 18 gauge.

The accompanying drawings only illustrate a single embodiment of a wire looping tool, its constituent parts, and method of use. However, other types and styles are possible, and the drawings are not intended to be limiting in that regard. Thus, although the description above and accompanying drawings contains much specificity, the details provided should not be construed as limiting the scope of the embodiment(s) but merely as providing illustrations of some of the presently preferred embodiment(s). The drawings and the description are not to be taken as restrictive on the scope of the embodiment(s) and are understood as broad and general teachings in accordance with the present invention. While the present embodiment(s) of the invention have been described using specific terms, such description is for present illustrative purposes only, and it is to be understood that modifications and variations to such embodiments, including but not limited to the substitutions of equivalent features, materials, or parts, and the reversal of various features thereof, may be practiced by those of ordinary skill in the art without departing from the spirit and scope of the invention. It should also be noted that the terms "first," "second" and similar terms may be used herein to modify various elements. These modifiers do not imply a spatial, sequential, or hierarchical order to the modified elements unless specifically stated.

The invention claimed is:

1. A combination looping and cutting tool for use in making jewelry and looping a segment of wire comprising:
   a first arm and a second arm, said first arm having a first upper section and a first lower section, said first arm forming a first handle at said first lower section of said first arm, and said second arm having a second upper section and a second lower section, and forming a second handle at said second lower section of said second arm to grip said tool;

a first looping member and a first cutting member branching from and attached to said upper section of said first arm, said first cutting member comprising a hooked section defining a hooked section space;

a second looping member and a second cutting member attached to said second upper section of said second arm, said second looping member and said second cutting member being positioned between said first looping member and said first cutting member when said first handle and said second handle are in a closed position; and said second looping member and said second cutting member being positioned interior of said hooked section space when said first handle and said second handle are in an open position; and an ejection aperture positioned in said hooked section.

2. The tool of claim 1, wherein said ejection aperture is positioned in a side of said hooked section whereby fragments of cut wire from said segment of wire are ejected laterally away from said tool along the same plane of movement of said first arm and said second arm when said tool is in use.

3. The tool of claim 1, further comprising a looping pin, wherein said first looping member and said second looping member together loop wire around said looping pin when said tool is in use.

4. The tool of claim 3, further comprising a retaining plate, wherein said looping pin is positioned in said retaining plate.

5. The tool of claim 1, further comprising a channel formed around said looping pin and defined by interior surfaces of said first looping member and said second looping member when said first handle and said second handle are in a closed position.

6. The tool of claim 1, further comprising a spring biasing said first handle and said second handle apart from one another.

7. The tool of claim 1, further comprising a retaining plate adapted to retain and guide the movement of said first arm and said second arm.

8. The tool of claim 7, wherein said retaining plate has a plurality of slots along which said first arm and said second arm move when said tool is in use.

9. The tool of claim 8, wherein said plurality of slots comprises a first slot, a second slot and a third slot, said first slot having a vertical orientation when said tool is upright and said second slot and said third slot each having a perpendicular orientation relative to said first slot.

10. The tool of claim 9, wherein said retaining plate is triangular.

11. A combination looping and cutting tool for use in making jewelry comprising:

a first handle and a second handle to grip said tool;

a first arm with a first upper section extending from said first handle, said first upper section comprising a first looping member having an first looping end, and a first cutting member defining a hooked section and an interior space and first cutting end that terminates at the end of said hooked section, wherein said first looping member and said first cutting member branch from said first upper section extending from said first handle;

a second arm with a second upper section extending from said second handle, said second upper section comprising an extension that defines a second looping member and a second cutting member positioned, wherein said extension is positioned between said first looping end and said first cutting end when said first handle and said second handle are in a closed position;

wherein said extension is positioned in said interior space when said first handle and said second handle are in an open position; and a retaining plate adapted to guide the movement of said first arm and said second arm; and a looping pin positioned in said retaining plate around which wire is looped when said tool is in use.

12. The tool of claim 11, further comprising an ejection aperture positioned in said hooked section.

13. The tool of claim 11, further comprising a spring biasing said first handle and said second handle apart from one another.

14. The tool of claim 11, further comprising a channel formed around said looping pin and defined by interior surfaces of said plurality of looping members when said first handle and said second handle are compressed together during use of said tool.

15. The tool of claim 11, wherein said first looping member is an external looping member and said second looping member is an internal looping member, wherein said external looping member and said internal looping member together loop said wire around said looping pin when said tool is in use.

16. The tool of claim 11, wherein said retaining plate has a plurality of slots along which said first arm and said second arm move when said tool is in use.

17. The tool of claim 16, wherein said plurality of slots comprises a first slot, a second slot and a third slot, said first slot having a vertical orientation when said tool is held upright and said second slot and said third slot each having a perpendicular orientation relative to said first slot.

18. A combination looping and cutting tool for use in making jewelry comprising:

a first arm having a first upper section that branches into a first looping end and a hooked section that terminates in a first cutting end, and a first lower section that forms a first handle for operating said tool;

a second arm having a second upper section that extends into a second looping end having a dorsal surface that forms a second cutting end, and a second lower section that forms a second handle for operating said tool with said first handle, wherein said second upper section is positioned in a space defined by said hooked section when said first arm and said second arm are in an open position;

a retaining mount for guiding the movement of said first arm and said second arm; and a looping pin around which said looping members converge when said first handle and said second handle are compressed when said tool is in use;

wherein said first cutting end is adapted to cut wire by engaging said second cutting end formed on said dorsal surface of said second looping end when said first handle and said second handle are compressed when said tool is in use.

19. The tool of claim 18, further comprising an ejection aperture positioned in said hooked section of said first upper section.

20. The tool of claim 18, wherein said retaining mount has a plurality of slots along which said first arm and said second arm move when said tool is in use.

21. The tool of claim 20, wherein said plurality of slots comprises a first slot, a second slot and a third slot, said first slot having a vertical orientation when said tool is held upright and said second slot and said third slot each having a perpendicular orientation relative to said first slot.

* * * * *